United States Patent
Chamberlain

[15] 3,642,355
[45] Feb. 15, 1972

[54] VIDEO FILM PROJECTOR
[72] Inventor: Earl Chamberlain, P.O. Box 603, Mount Hermon, Calif. 95041
[22] Filed: Nov. 12, 1969
[21] Appl. No.: 875,896

[52] U.S. Cl. ...........................352/92, 352/130, 352/236
[51] Int. Cl. .........................................................G03b 21/50
[58] Field of Search ...........................352/92, 130, 236

[56] References Cited

UNITED STATES PATENTS

| | | | |
|---|---|---|---|
| 2,151,822 | 3/1939 | Winchester | 352/130 |
| 2,177,788 | 10/1939 | Ross | 352/130 X |
| 3,139,793 | 7/1964 | Bradford et al. | 352/92 X |
| 3,432,228 | 3/1969 | Hellmund | 352/92 UX |
| 3,515,470 | 6/1970 | Browder | 352/92 |

Primary Examiner—Louis R. Prince
Assistant Examiner—Joseph W. Roskos
Attorney—Fryer, Tjensvold, Feix, Phillips & Lempio

[57] ABSTRACT

A film-coding and code-reading device for a motion picture projector comprises a film-edge-notching punch and a film edge notch sensor. The punch and sensor are disposed in coaxial relationship within the projector gate whereby any desired film frame may be editorily marked.

2 Claims, 11 Drawing Figures

PATENTED FEB 15 1972

INVENTOR
EARL CHAMBERLIN
BY
ATTORNEY

INVENTOR
EARL CHAMBERLIN
BY
ATTORNEY

INVENTOR
ARL CHAMBERLIN
BY
ATTORNEY

VIDEO FILM PROJECTOR

This invention is related to the field of motion picture projectors. Typically, motion picture projectors display a series of pictures developed from a series of exposures made by a motion picture camera. The exposures are made and developed on a long strip of film. The projector displays the pictures by directing a beam of light through the transparent picture disposed in the projector aperture. An appropriate lens is employed to focus the image of the picture on a remote screen. The light from the aperture is then blanked by some kind of a shutter while the film strip is indexed to the next picture on the film, whereupon the light through the aperture is unblanked and the next picture in the series is displayed on the screen. In this way the projector displays a series of pictures on the screen.

The effect of motion pictures is achieved by displaying a series of still pictures to the eye because the retina retains an image for a short time after the image is no longer being viewed by the eye. This retention of an image by the retina after it is no longer being viewed by the eye is known as "visual persistance." If the eye is shown another picture while the first picture is still retained on the retina, and the second picture is not very different from the first, the change will be seen, but will not be recognized. Thus, a rapid series of slightly different pictures will be interpreted by the mind as motion.

If the pictures, or "frames," are displayed at the same speed at which they were taken by the camera, the resulting apparent motion will be seen at the same speed at which it occurred, regardless of what the "frame speed" might be. However, if the sequential pictures are to be only slightly different, the frame speed must be increased as the speed of the motion photographed increases.

In photographing and displaying any given action or motion, it is desired to minimize the number of frames required, and thus minimize the amount of film required. Less film means reduced film storage requirements in the camera and the projector, and reduced film and film development costs.

However, as the number of frames used to record a motion is decreased, the frame speed is likewise necessarily decreased. Thus motion picture systems must compromise between a desire to minimize the amount of film required to record a motion and the desire to prevent the observance of "flicker" and "jerk" by the viewers of the program shown.

"Flicker" is the detection by the eye of the blanking of the light from the projector while the frames are changed. "Jerk" is the detection by the eye of a series of discrete pictures.

Flicker can be reduced by shortening the amount of time that the projector is blanked and the screen is dark.

Jerk can be reduced by increasing the rate at which the pictures are shown to the eye. Alternatively, it can be reduced by slowing down the response of the eye until it is no longer able to detect a series of discrete pictures.

It has been found that, within limits, visual persistance, or the response of the eye to different images, is greatly affected by the brightness of the images viewed. Thus, if a picture projected on a screen is not interrupted by a shutter until it is changed, more light will enter the eye while the picture is projected, and visual persistance will be enhanced.

Accordingly, it is an object of this invention to change frames in a motion picture projector at a very high speed which is independent of the frame speed of the projector.

It is another object of this invention to operate the shutter of a motion picture projector at a very high speed to blank the aperture only while the frames are being changed.

It is another object of this invention to operate a motion picture projector at a variable frame speed in accordance with the speed of motion being reproduced.

It is a further object of this invention to utilize the reduced film storage requirements of the projector employing a film storage cassette which is easily insertable into the projector, and requires no subsequent threading operations.

Another object of this invention is to be able to encode any particular frame of the film while it is in the aperture of the projector which can later be detected when the frame is again in the projector aperture to initiate any desired operation, such as a timed pause in the film advance.

It is another object of this invention to automatically take up the film as it emerges from the gate of the projector and store it temporarily on a takeup reel located within the projector.

It is another object of this invention to automatically rewind the film from the takeup reel onto the cassette reel upon reaching the end of the film.

As was mentioned, in order to authentically reproduce a given motion, the film frames must be projected at the same speed that they were photographed.

The most common way of doing this is to standardize upon certain frame speeds throughout the industry. The great disadvantage in such constant speed systems was that the standard frame speeds had to be fast enough to reproduce the fastest anticipated motion without a jerky appearance. The average motion in a motion picture is considerably slower than the fastest motion, and the result was that great quantities of film were wasted because the system was running faster than necessary most of the time.

To minimize film footage, a variable speed system is required. In such a system, the expert cameraman operates his camera at the minimum speed to which he knows from experience is fast enough to record the motion being photographed without jerk. Such variable speed cameras record their speed of operation on a program which is later used to control the speed of the projector when projecting the film. The best way of producing such a frame speed program is by use of an electronic circuit which includes a switch operated by the film frame change mechanism of the camera to produce electrical impulses upon the change of film frames in the camera, which are recorded on a magnetic tape.

In the past, the speed of the projector has been compared with the speed of the camera as recorded in the frame speed program, and adjusted accordingly. This was done by means of electronic and mechanical devices used in conjunction with the projector.

My invention represents a great improvement over the prior art. My projector is operated directly by the electrical impulses recorded on the frame speed program tape. The tape may be "played" on any tape recorder at the speed at which it was recorded, and the output of the recorder fed directly to the projector. For sound capabilities, the speed program may be recorded on another "track" of the same tape and the two may be played simultaneously on one tape recorder when using my projector.

My projector utilizes a linear motor to respond directly to the electrical impulses recorded on the frame speed tape to operate a frame change mechanism having a fast operating time.

In addition, I have employed a "butterfly" shutter which is engaged directly by the film and is held shut while the film is moving through the aperture. The shutter comprises a very light rotating vane that flips closed and open at a very fast speed.

My projector also includes a cassette which extends into the projector to form a portion of the projector gate. The film is wound on a reel disposed within the cassette. The end of the film is held lightly between two surfaces which form an opening in the cassette and comprise a portion of the projector gate when the cassette is inserted in the projector. Thus, upon insertion of the cassette into the projector, the film is already in the gate and ready to be advanced by the film advance mechanism.

The projector also includes a punch for placing a notch in the edge of the film at any desired location. Such notches are in common use in the industry for a number of purposes. However, with prior art devices for notching the film, it has been impossible to achieve any degree of accuracy in locating the notch on the film with respect to the desired frame. My invention makes it possible to choose the exact frame at which the notch will be detected by the projector. This is accomplished by locating the notch puncher and the notch detector at the same location on the path of the film. The punch comprises a hollow cylinder having one side which is partially cut away and which partially overlaps the film. The notch detector is disposed within the punch and rides lightly on the edge of the film. When a notch registers with the punch, the detector emerges from the cutaway side of the punch to follow the edge of the film. The movement of the detector closes a microswitch which activates the desired circuit.

My projector also employs an improved gate which minimizes the effects of distortion of the film from thermal expansion. When the film is disposed within the aperture of a projector it is usually subjected to rather high temperatures resulting from the energy radiated by the light source, most of which is directed through the film. The resulting thermal expansion of the film causes distortion which affects the focus of the projected image. In the past, automatic focusing devices have been employed to maintain a sharp image on the screen. I have found that this distortion of the film can be minimized by employing a gate having a slight longitudinal curve, which causes the film to be slightly flexed longitudinally.

Further objects and advantages of the present invention and the manner in which it is carried into practice will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention within the purview of the appended claims.

Figure 1:
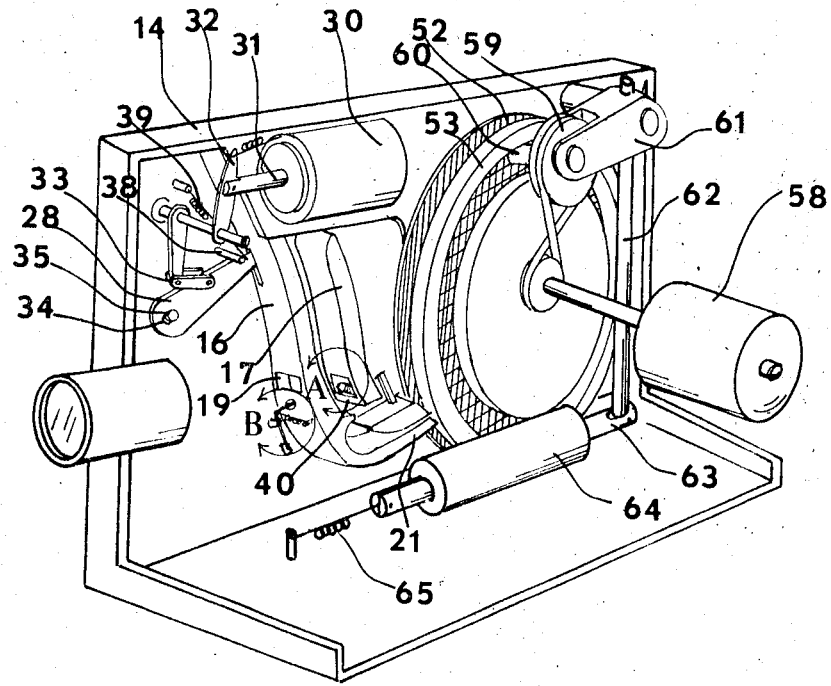
FIG. 1 is a perspective view of my projector with part of the case cut away.

In FIG. 1 a projector is shown having a gate 15 formed by members 16 and 17 and cassette 18. Members 16 and 17 are slightly curved longitudinally to prevent distortion of the film from thermal expansion, and include an aperture 19. In operation, film feeds out of cassette 18 at its mouth 20 and down through gate 15, past aperture 19, along guide 21 and on to takeup reel 22 as hereinafter described.

Figure 3:
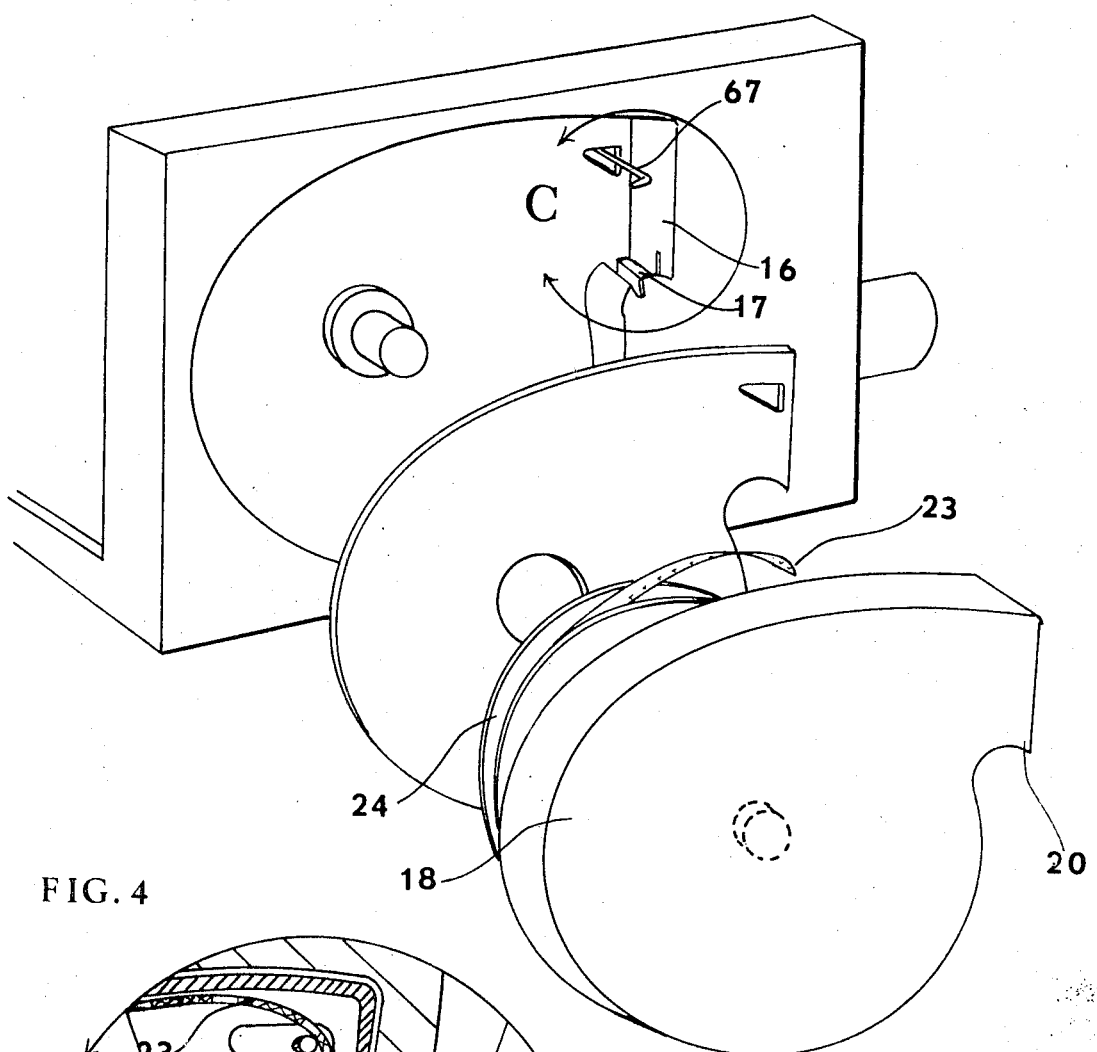
FIG. 3 is an exploded perspective view of the opposite side of the projector from that shown in FIG. 1, showing the film cassette and reel.
Figure 4:
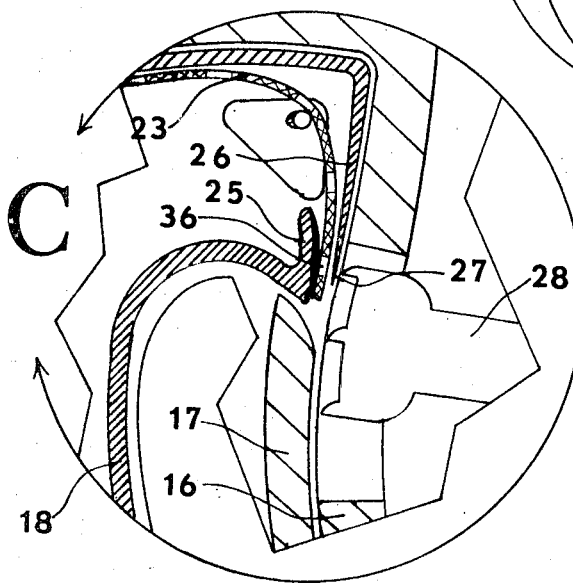
FIG. 4 is a partial enlarged sectional elevation view of the area of the projector indicated by the arrows C in FIG. 3, with the cassette inserted in the projector.

As shown in FIG. 3, film 23 is stored on a reel 24 disposed within cassette 18 which is formed of some suitable material such as plastic. Cassette 18 has a mouth shown generally at 20 which, as shown in FIG. 4, comprises a lower lip 25 and an upper lip 26, which overlaps lower lip 25.

Figure 2:
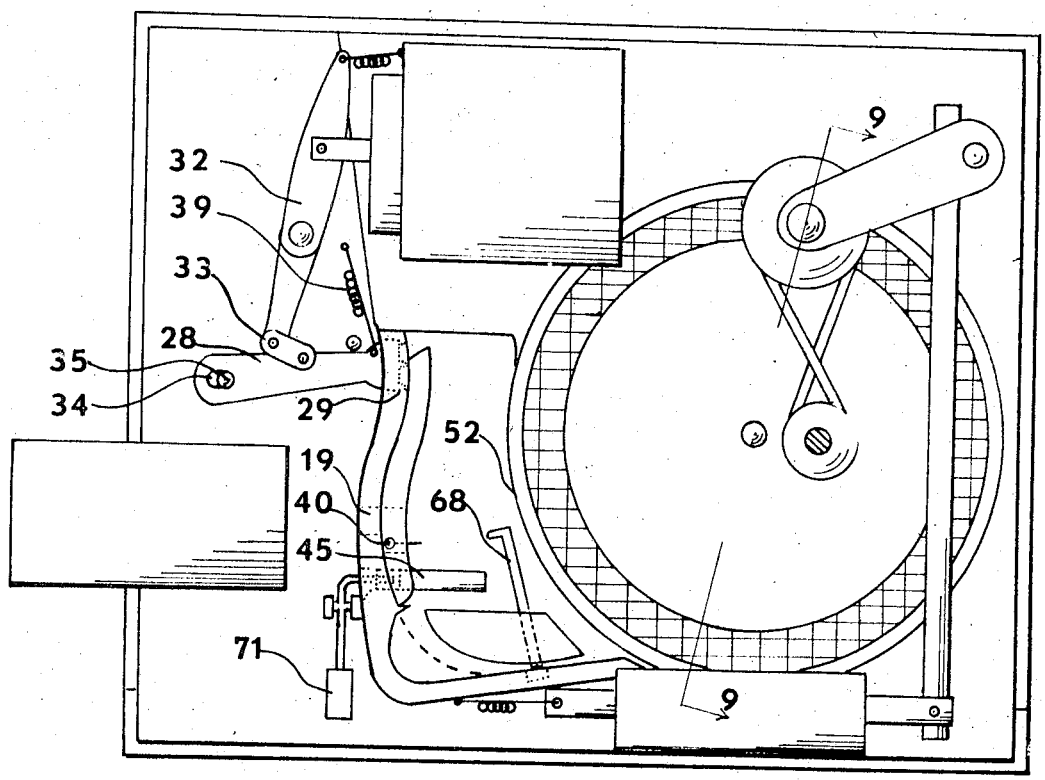
FIG. 2 is a side elevation view of my projector with the gate shown in section.

When cassette 18 is inserted in the projector, mouth 20 is aligned with members 16 and 17 and forms a portion of gate 15. The end of film 23 extends between lips 25 and 26 to the lower edge of lip 25, which includes a slot 27. As shown in FIGS. 4 and 2, claw 28 is positioned adjacent to the depending end of film 23 and is operable to engage the film and advance it through the gate in the manner described below.

Referring to FIG. 1, a linear motor 30 includes a rod 31 which is pivotally connected to one end of a lever 32 which is pivotally connected to frame 14 at a point intermediate its ends. The other end of lever 32 is pivotally connected to a link 33 which in turn is pivotally connected to claw 28. One end of claw 28 includes a slot 34 which slides on pin 35 attached to frame 14.

When a signal is received by linear motor 30, it is energized, and rod 31 extends rotating lever 32 counterclockwise as viewed in FIG. 1. The lower end of lever 32 exerts a force, through link 33, on claw 28 which is allowed to slide towards the film by slot 34. Points 29 on claw 28 engage the film, slightly penetrating lower lip 25 through slot 27. At this time pin 35 reaches the outer end of slot 34, whereupon claw 28 stops moving toward the film and begins to rotate downward around pin 35 as lever 32 continues to turn. As claw 28 rotates downward, teeth 29 penetrate perforations 36 in the film and move the film down through the gate until lever 32 and 33 are fully extended, at which time linear motor 30 is deenergized, and the claw is withdrawn from the film and returned to its original position against stop 38 by spring 39. Successive impulses fed to linear motor 30 will cause the claw to successively advance the film one frame at a time through the gate as it engages successive perforations in the film and pulls it downward a distance equal to the height of a frame.

Referring to FIG. 2, it will be seen that as the film moves through the gate it will move past aperture 19 within which is disposed a shutter shown generally at 40.

Figure 5:
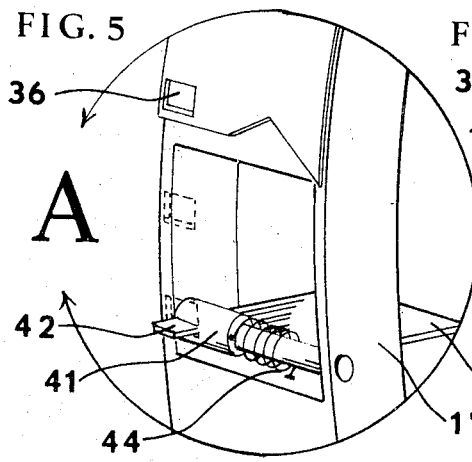
FIG. 5 is an enlarged perspective view of the shutter of my projector, indicated by the arrows A in FIG. 1.

Referring to FIG. 5, shutter 40 is shown as comprising a cylinder 41 having its ends journaled into member 17 on either side of the aperture. Near one end of the cylinder, a flat tab 42 projects radially from the cylinder and is of appropriate size and position to engage perforations 36 in film 23, shown in phantom. Projecting from cylinder 41 diametrically opposite tab 42 is a vane 43, of sufficient size to obstruct the aperture.

Figure 6:
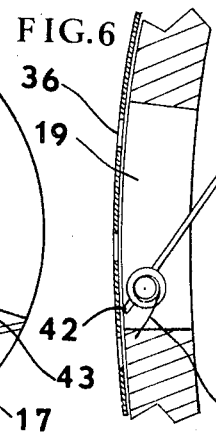
FIG. 6 is a side elevational view in section of the shutter shown in FIG. 5, showing the shutter in the closed position.
Figure 7:
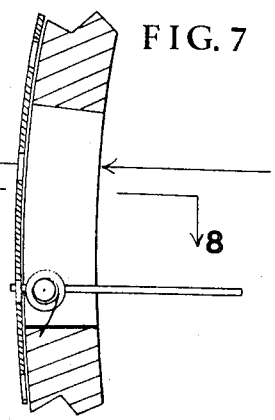
FIG. 7 is a side elevational view in section of the shutter shown on the open position.

As shown in FIG. 6, when film 23 moves downward, perforation 36 is moved out of registration with tab 42. As a result, tab 42 is pushed downward and held down by the film until the next perforation registers with the tab whereupon cylinder 41 returns to its original position, shown in FIG. 7, under the force of torsional spring 44.

As shown in FIG. 6, when cylinder 41 is rotated by the downward deflection of tab 42, vane 43 is deflected upward and obscures aperture 19 while the film is being indexed to the next frame, whereup it returns to its original position shown in FIG. 7, once again opening the aperture.

It will be appreciated that the speed at which the claw advances the film, and consequently closes the shutter, can be quite fast depending only upon the design of the components, without regard to the frame speed being used.

Figure 10:
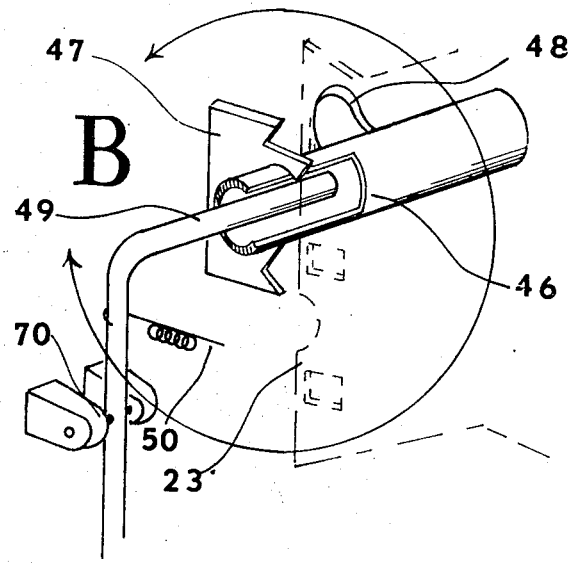
FIG. 10 is an enlarged perspective view of my film coder shown in the area indicated by the arrows B in FIG. 1.
Figure 11:
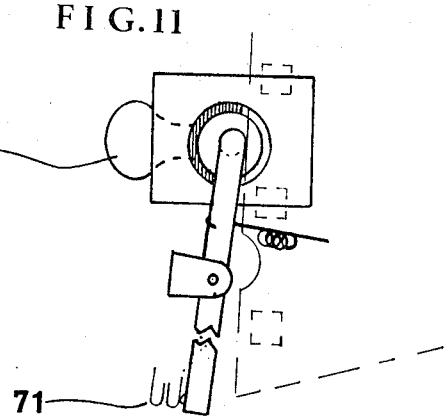
FIG. 11 is an end view of the coder shown in FIG. 10.

Referring again to FIG. 2, as the film moves farther through the gate, it moves past a coder shown generally 45. As shown in FIG. 10, coder 45 comprises a hollow cylindrical punch 46, having one side partially cut out, and which cooperates with a die 47 to cut an arcuate notch in the edge of film 23 when the punch is manually operated by means of tab 48, extending from one side of the punch through the projector frame. An arm 49, pivoted at 70 engages the edge of the film at the center of the punch so that when an arcuate notch registers with the punch, the arm will pivot under the force of spring 50, closing a microswitch 71 which actuates any desired circuit such as the delay circuit disclosed in my copending application Ser. No. 765-081.

Figure 9:
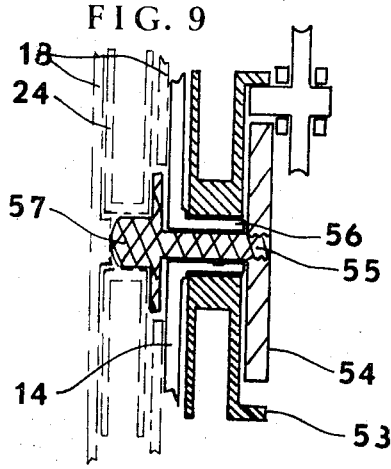
FIG. 9 is a sectional view of the takeup reel and rewind wheel assembly taken along the line and in the direction indicated by the arrows 9—9 in FIG. 2.
Figure 8:
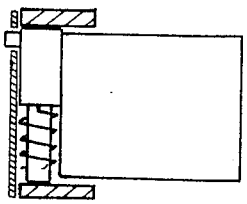
FIG. 8 is a top plan view of shutter taken along the line and in the direction indicated by the arrows 8—8 in FIG. 7.

Referring again to FIG. 2, as the film moves out of the gate it is guided onto takeup reel 52. As shown in FIG. 9, one flange of reel 52 includes an annular ring 53. A rewind wheel 54 is mounted concentrically within ring 53 on shaft 55 which extends coaxially through projector frame 14 and reel axle 56, and is connected to spindle 57 upon which is mounted cassette reel 24.

A motor 58 drives pulley 59 carried by arm 61 which is pivotally mounted on the projector frame. Pulley 59 includes a shaft 60 which projects into the annular space between ring 53 and wheel 54. A lever 62 has one end rigidly connected to arm 61, and its other end pivotally connected to rod 63 of solenoid 64.

In operation, tension spring 65 attached to rod 63 exerts a force on rod 63, which in turn exerts a torque on arm 61 by means of lever 62, causing shaft 60 of pulley 59 to bear against annular ring 53. Thus, as motor 58 drives pulley 59 and shaft 60, the shaft exerts a frictional force on the annular ring of the takeup reel, causing the takeup reel to rotate and take up the film until the film between the reel and the gate becomes taut, at which time shaft 60 will slip with respect to ring 53.

As shown in FIG. 3, a spring wire finger 67 projects into film cassette and contacts the film as it loops down toward the mouth of the cassette. When the end of the film, which is attached to the cassette reel, is reached, the film in the cassette, between the reel and the mouth will become taut, deflecting finger 67. When finger 67 is deflected it contacts a microswitch, not shown, which causes solenoid 64 to be energized, moving rod 63 toward the right, as viewed in FIG. 1, and rotating arm 60 counterclockwise until shaft 60 of pulley 59 bears against rewind wheel 54. Shaft 60 will now frictionally drive the rewind wheel in the opposite direction that it drove the takeup reel. Since the rewind wheel is connected to spindle 57 by shaft 55, the spindle and the cassette reel mounted thereon will also turn, rewinding the film onto the cassette reel.

A film sensor 68, comprising a plastic reed which is unseated by film 23, senses when the takeup reel is empty and the film has cleared its station by seating, which opens a microswitch in the operating circuit of solenoid 64 which is then deenergized. Spring 65 then causes shaft 60 to disengage the rewind wheel and again engage takeup reel. The cassette is then removed from the projector, and the film is manually pulled out of the gate and shoved into the cassette until the end of the film is once again disposed at the mouth of the cassette.

I claim:

1. In a motion picture projector having a frame, a gate for receiving a strip of film having a series of frames developed therein and guiding it through the projector, said gate including an aperture for displaying frames, and a film-driving mechanism for driving a strip of film through the gate, a device for coding any desired frame on the film to initiate a desired operation upon display of the frame in the aperture comprising punching means to form a notch in the edge of a film strip, and sensing means to detect a notch in the edge of a film strip, said punching means and said sensing means being located in the gate at the same point in the path of the film.

2. The invention defined in claim 1 wherein the punching means comprises a hollow cylinder having one side partially cut away, and overlapping the film, and the sensing means comprises a pivoted arm having one end which extends into the hollow cylinder and is held against the edge of the film by a spring means, and having its other end in operable association with a switch, whereby the switch is operated upon pivoting of the arm.

* * * * *